United States Patent
Marchione

(10) Patent No.: US 10,166,634 B2
(45) Date of Patent: Jan. 1, 2019

(54) LASER CLADDING USING FLEXIBLE CORD OF HARDFACING MATERIAL WITH DIAMOND

(71) Applicant: Caterpillar Inc., Peoria, IL (US)

(72) Inventor: Thierry Andre Marchione, Mossville, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/373,614

(22) Filed: Dec. 9, 2016

(65) Prior Publication Data

US 2018/0161933 A1    Jun. 14, 2018

(51) Int. Cl.
| | |
|---|---|
| *B23K 26/34* | (2014.01) |
| *B23K 26/342* | (2014.01) |
| *B23K 26/70* | (2014.01) |
| *B23K 35/02* | (2006.01) |
| *B23K 35/30* | (2006.01) |
| *B23K 35/32* | (2006.01) |
| *B23K 35/36* | (2006.01) |
| *B23K 35/365* | (2006.01) |
| *C23C 26/00* | (2006.01) |
| *C25D 3/12* | (2006.01) |
| *C25D 3/38* | (2006.01) |

(Continued)

(52) U.S. Cl.
CPC .......... *B23K 26/342* (2015.10); *B23K 26/702* (2015.10); *B23K 35/0261* (2013.01); *B23K 35/3033* (2013.01); *B23K 35/327* (2013.01); *B23K 35/365* (2013.01); *B23K 35/3612* (2013.01); *C23C 24/103* (2013.01); *C23C 26/00* (2013.01); *C25D 3/12* (2013.01); *C25D 3/38* (2013.01); *C25D 5/54* (2013.01)

(58) Field of Classification Search
CPC .................. B23K 26/34; B23K 36/342; B23K 35/22–35/34
USPC .................. 219/76.1, 121.12–121.15, 121.6, 219/121.63–121.66
See application file for complete search history.

(56) References Cited

U.S. PATENT DOCUMENTS

| | | | | |
|---|---|---|---|---|
| 4,781,770 A | * | 11/1988 | Kar ........................ | B23K 26/34 148/220 |
| 5,321,224 A | * | 6/1994 | Kamimura ............... | B23K 9/04 219/137 R |

(Continued)

FOREIGN PATENT DOCUMENTS

EP    2295189    3/2011

OTHER PUBLICATIONS

"Metal Coated Particles and Defense Applications", Todd G. Johnson, *Federal Technology Group* (2012).

*Primary Examiner* — Michael Laflame, Jr.
(74) *Attorney, Agent, or Firm* — Finnegan, Henderson, Farabow, Garrett & Dunner, LLP

(57) ABSTRACT

A method of hardfacing a component includes generating a laser beam and directing the laser beam to an area of a wear surface of the component. The method includes feeding a flexible cord of a cladding material into the laser beam to melt the flexible cord and produce a bead of the cladding material on the wear surface. The flexible cord includes an inner metal wire surrounded by an agglomerate of abrasion and wear-resistant material that contains diamond particles. The method further includes moving the laser beam and the flexible cord along the wear surface to produce a cladding layer over the wear surface of the component.

11 Claims, 2 Drawing Sheets

(51) Int. Cl.
    *C25D 5/54*         (2006.01)
    *C23C 24/10*     (2006.01)

(56) References Cited

U.S. PATENT DOCUMENTS

| | | | |
|---|---|---|---|
| 5,755,299 A * | 5/1998 | Langford, Jr. | B23K 35/0266 |
| | | | 175/375 |
| 7,469,972 B2 | 12/2008 | Hall et al. | |
| 8,079,428 B2 * | 12/2011 | Lyons | B23K 35/36 |
| | | | 175/374 |
| 2005/0158200 A1 * | 7/2005 | Pope | A61F 2/30767 |
| | | | 419/11 |
| 2006/0049153 A1 * | 3/2006 | Cahoon | B23K 26/03 |
| | | | 219/121.63 |
| 2010/0084379 A1 | 4/2010 | Wahlen et al. | |
| 2010/0193254 A1 * | 8/2010 | Lind | B22F 3/26 |
| | | | 175/393 |
| 2012/0325779 A1 * | 12/2012 | Yelistratov | B23K 9/04 |
| | | | 219/76.14 |
| 2014/0298728 A1 * | 10/2014 | Keshavan | E21B 10/56 |
| | | | 51/298 |
| 2015/0047201 A1 | 2/2015 | Steinmetz et al. | |
| 2015/0266124 A1 * | 9/2015 | Beary | B23K 9/04 |
| | | | 219/76.14 |
| 2015/0290771 A1 * | 10/2015 | Li | B24D 3/06 |
| | | | 51/295 |
| 2016/0318282 A1 * | 11/2016 | Muchtar | B23K 35/308 |

\* cited by examiner

LASER CLADDING USING FLEXIBLE CORD OF HARDFACING MATERIAL WITH DIAMOND

TECHNICAL FIELD

The present disclosure is directed to a laser cladding method and, more particularly, to a laser cladding method using a flexible cord of hardfacing material with diamond.

BACKGROUND

Many ground engagement tools, drill bits, cold planers, pavement milling tools, asphalt picks, mining picks, hammers, and other wear-resistant tools experience abrasive conditions, which can cause accelerated wear of the components. This wear can cause operational problems such as underperformance of ground engagement tools and pavement degradation tools, increased demands on the machine components that operate the wear-resistant tools, and the expense and downtime resulting from having to frequently replace the worn components. Accordingly, some wear parts are fabricated with a wear surface having enhanced material properties.

Properties such as hardness are important factors that determine the wear resistance of a metal. Hardness relates to the resistance of the metal to scratching or abrasion. The higher the hardness of the metal, the greater its resistance to wear. In some cases, after fabrication of a metal component, a heat treatment operation may be performed to increase the hardness of the component surface. As a result of the heat treatment operation, a layer of material at the component surface may have a higher hardness than the bulk of the component. The increased hardness at a surface that will experience wear improves the wear resistance and prolongs the useful life of the component. Although in general, surface hardening improves wear resistance, for components that experience very high rates of wear, increased surface hardness produced by a heat treatment operation may be insufficient for a beneficial improvement in wear resistance. Such components may be hardfaced and then heat treated to further improve wear resistance.

Hardfacing is a low cost method of depositing wear resistant surfaces on metal components to extend service life. The American Welding Society defines hardfacing as "[a] surfacing variation in which surfacing material is deposited to reduce wear." The term surfacing is defined as "[t]he application by welding . . . of a layer, or layers, of material to a surface to obtain desired properties or dimensions, as opposed to making a joint." AWS A3.0 Standard Welding Terms and Definitions. As opposed to a hardening heat treatment operation, which involves changing the microstructure and mechanical properties of the component surface, hardfacing involves the deposition of a new material on the base material of the component. In general, the clad material may have a similar or a different composition than the base material. Hardfacing may be performed using a number of welding (or cladding) techniques. These known techniques can be broadly classified into three categories as arc welding (or arc cladding), thermal spraying, and laser-based cladding. The current disclosure is directed to hardfacing of a metal component using a laser cladding process.

A wide variety of hardfacing materials have been satisfactorily used on drill bits, pavement degradation tools, and other wear-resistant tools. A frequently used hardfacing material includes sintered tungsten carbide (WC) particles in an alloy steel matrix deposit. Other forms of tungsten carbide particles may include grains of monotungsten carbide, ditungsten carbide and/or macrocrystalline tungsten carbide. U.S. Pat. No. 7,469,972 to Hall et al. ("the '972 patent") discloses a wear-resistant tool that comprises first and second cemented metal carbide segments chemically bonded together at an interface by brazing. One of the metal carbide segments may be bonded to a superhard material such as polycrystalline diamond. The cost of wear-resistant tools manufactured using the process disclosed in the '972 patent may be prohibitively expensive as a result of the use of large chunks of polycrystalline diamond, which are bonded to the contact surface of the tool. On the other hand, the less expensive methods of hardfacing using only tungsten carbide particles in an alloy steel matrix deposit may not provide the required level of protection against wear and erosion, and would therefore benefit from solutions that increase the wear resistance while controlling the costs of the materials and methods.

The method of the present disclosure is directed at solving one or more of the problems set forth above and/or other problems in the art.

SUMMARY

In one aspect, the disclosure is related to a method of hardfacing a component. The method may include generating a laser beam and directing the laser beam to an area of a wear surface of the component, and feeding a flexible cord of a cladding material into the laser beam to melt the flexible cord and produce a bead of the cladding material on the wear surface. The flexible cord may include an inner metal wire surrounded by an agglomerate of abrasion and wear-resistant material that contains diamond particles. The method may include moving the laser beam and the flexible cord along the wear surface to produce a cladding layer over the wear surface of the component.

In another aspect, the disclosure is related to a flexible cord of laser cladding material. The flexible cord may include a center metal wire and an agglomerate surrounding the center metal wire. The agglomerate may include a metal matrix, an organic binder, and hard particles including diamond particles.

In yet another aspect, the disclosure is related to a laser cladding process. The laser cladding process may include generating a laser beam, directing the laser beam to an area of a wear surface of a component, and feeding a flexible cord of a cladding material into the laser beam to melt the flexible cord and produce a bead of the cladding material on the wear surface. The flexible cord includes an inner metal wire surrounded by an agglomerate of abrasion and wear-resistant material. The agglomerate contains a metal matrix, an organic binder, and diamond particles, and is formed as a paste extruded onto the inner metal wire and allowed to dry and harden to form the flexible cord.

DETAILED DESCRIPTION

Machining wear resistant material is both difficult and expensive. Therefore, a metal wear part may be formed with a desired configuration and the surface of the part may be subsequently treated by directly hardening the metal part (carburizing and nitriding) or by applying a layer of wear resistant material (hardfacing) to the surface depending upon the amount of wear resistance desired. For applications when resistance to extreme wear of a working surface of a metal part or substrate is required, hardfacing such as a metallic matrix deposit having a layer of hard, wear resistant material may be applied to a working surface on a wear part to protect the underlying substrate.

The hardfacing material on a wear part may be a mixture of a hard, wear-resistant material embedded in a metallic matrix deposit, which is fused with the surface of a substrate by forming metallurgical bonds to ensure uniform adherence of the hardfacing to the substrate. For some applications, the wear-resistant material such as an alloy of tungsten carbide and/or cobalt is placed in a steel tube which serves as a welding rod during welding of the hardfacing with the substrate. This technique of applying hardfacing is sometimes referred to as "tube rod welding." Tungsten carbide/cobalt hardfacing applied with tube rods has been successful in extending the service life of drill bits and other downhole tools.

Figure 1:
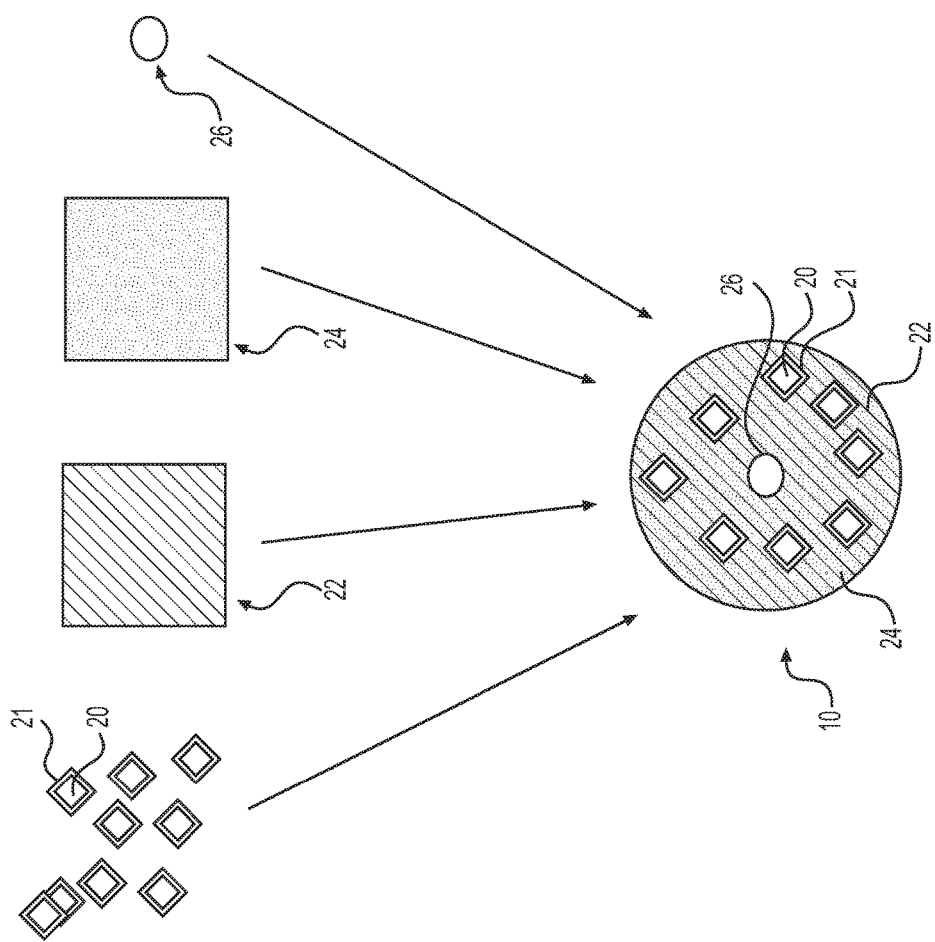
FIG. 1 is a schematic illustration of an exemplary method for forming a flexible cord of laser cladding materials for use in a laser cladding operation according to an embodiment of this disclosure.
Figure 2:
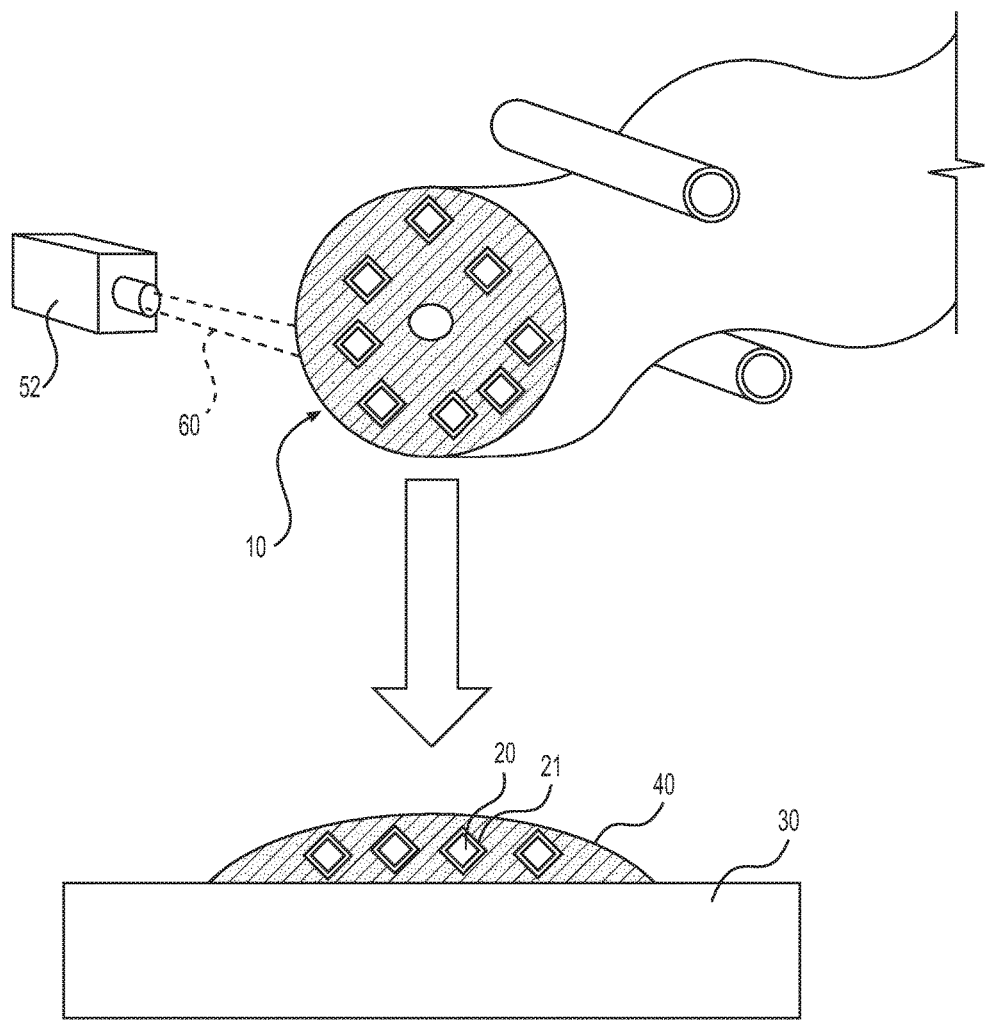
FIG. 2 is a schematic illustration of a laser cladding process using the flexible cord of FIG. 1.

FIG. 1 is a schematic illustration of a process according to an exemplary implementation of this disclosure for forming a flexible cord (also referred to herein as "flexcord") 10 that comprises the hardfacing materials used in a laser cladding operation on a surface of a metal substrate 30 (FIG. 2). The substrate 30 may be formed from a wide variety of metal alloys having desirable metallurgical characteristics such as machinability, toughness, heat treatability, and corrosion resistance. For example, the substrate 30 may be formed from the various steel alloys associated with the manufacture of tool bits used on cold planers for milling pavement, or other tools that are subjected to wear during use. Hardfacing through laser cladding may be performed on any surface of a wide variety of tools such as pavement grinding tools, saws, chisels, milling tools, ground engagement tools, and other tools that can benefit from protection against abrasion, erosion and/or wear.

The flexcord 10 according to embodiments of this disclosure enables the implementation of a continuous laser cladding process, wherein the feed and deposition rates of a homogeneous agglomerate of laser cladding material can be consistently and accurately controlled. The flexibility of the flexcord 10 facilitates application of the laser cladding materials on surfaces that are not readily accessible using more rigid welding rods or when applying wear-resistant materials using tube rod welding techniques. The flexcord 10 also facilitates the application of an even distribution of the laser cladding materials during the laser cladding operation. In contrast to laser cladding techniques using loose powders containing hard materials such as tungsten carbide and diamond, the flexcord 10 containing interspersed hard particles such as diamond pellets mixed throughout a metal matrix ensures that a homogeneous metallic matrix deposit of the hardfacing materials is applied across the surface of a part being laser cladded.

A length of the flexcord 10 can be continuously fed by any of a variety of different methods and feeding apparatus into the path of a laser beam 60 produced by a laser device 52. The laser beam 60 can be focused onto a surface of the substrate 30 by various mirrors, lenses, and other optical devices (not shown) and at least one of the laser beam 60 and the substrate 30 can be moved relative to the other during the laser cladding operation. An end of the flexcord 10 is fed into the path of the laser beam 60 at the surface of the substrate 30 and heated by the laser beam to form a molten bead 40 of hardfacing materials on the surface. The end of the flexcord 10 and the laser beam 60 can be moved across the surface of the substrate 30 in a back and forth pattern or other pattern of relative movement to result in the formation of the continuous bead 40 of molten cladding material across the surface. In various implementations of a laser cladding method according to this disclosure, the laser beam 60 and the flexcord 10 can be moved relative to a surface of the substrate 30, while the substrate is maintained in a fixed position, or the substrate 30 can be moved relative to a stationary laser beam, while the flexcord 10 is fed into the beam. In still further alternative implementations, all of the laser beam 60, the flexcord 10, and the substrate 30 may be moved relative to each other as the bead 40 is formed across a desired portion of the surface of the substrate 30.

The flexcord 10 may be formed by extruding an agglomerate having the consistency of a paste around and along a length of a metal wire 26, and allowing the paste to dry and harden to adhere to the metal wire 26 and form a length of flexible cord. The metal wire may be produced from a pliable metal such as nickel (Ni) such that the resultant flexcord 10 will retain sufficient flexibility after the agglomerate is applied to the metal wire and the agglomerate has dried and hardened. Other metals such as Titanium (Ti) may also be used for the wire. The flexibility of the flexcord 10 allows for more precise control of the application of the cladding materials along surfaces of a substrate that may not be easily accessible for a rigid rod or tube of cladding material. Additionally, the flexcord allows for a more homogeneous application of the laser cladding materials along the substrate than can be obtained when the cladding materials are provided in a powder form. The metal wire 26 at the center of the flexcord 10 may include nickel (Ni), copper (Cu), Titanium (Ti) or another metal that will melt when exposed to a laser beam and form a desired component of the cladding layer. The agglomerate may be formed as a blend of the hardfacing materials and an organic binder, and may include a metal matrix 22, an organic binder 24, and diamond pellets 20, 21. The agglomerate and the metal wire 26 will melt upon exposure to a laser beam and form a metallic matrix deposit along a surface of the substrate 30 as the flexcord 10 and the laser beam 60 are moved relative to the surface to form a molten bead 40.

The diamond pellets may be formed by coating and encapsulating diamond particles or agglomerates of very small diamond particles 20 with a layer of a protective coating 21. The protective coating 21 protects the diamond particles from exposure to sufficient heat during the laser cladding process to cause any degradation of the diamond back to carbon (graphitisation), as well as assisting bonding of the diamond particles with the surrounding materials. Graphitisation is a microstructural change to the diamond resulting in a chemical degradation of the diamond, and may occur at temperatures of approximately 600° C. Therefore, with temperatures during a laser cladding process potentially reaching 1700° C., the diamond particles must be protected from exposure to those temperatures in order to retain their desirable characteristics. The protective coating 21 also adds mass to the diamond particles, which are of low density, and therefore prevents migration of the diamond particles through the agglomerate during mixing of the metal matrix 22, the organic binder 24, and the diamond pellets 20, 21. The protective coating 21 therefore ensures a more even distribution of the diamond particles 20 throughout a cladding layer produced by melting the flexcord 10 onto a surface of the substrate 30. Various methods for encapsulating the diamond particles 20 with the protective coating 21 may include electrolysis, electroless plating, and electroplating. The protective coating 21 uniformly encapsulates the diamond particle 20, and is a layer of hard material that has been metallurgically bonded to the exterior of the diamond particle 20 as a result of the plating processes. The protective coating 21 may also be formed from sinterable materials including various metal alloys and cermets such as metal borides, metal carbides, metal oxides and metal nitrides. In various exemplary implementations of this disclosure the diamond particles 20 may be agglomerates of very small diamond particles that are less than 20 microns (μm) in diameter, or larger diamond particles that are approximately 250 microns (μm)±10% in diameter or larger. The protective coating 21 encapsulating each diamond particle 20 may range from approximately 260 μm±10% in outer diameter to approximately 1500 μm±10% in outer diameter. The protective coating 21 encapsulating each diamond particle 20 may therefore range in thickness from approximately 5 μm±10% to approximately 625 μm±10%.

Depending upon the intended application for the part with the laser cladded surface, various types of tungsten carbide (WC) may also be used to form all or a portion of the protective coating 21 on the diamond particles 20. Tungsten carbide particles may also be included in the metal matrix 22 of the agglomerate extruded around the center metal wire 26. In addition to WC, other alternatives may include TiC, Ti $B_2$, $Cr_6C$, $B_4C$ and other alloys. The incorporation of hard particles such as tungsten carbide throughout the metallic matrix deposit that is formed on the surface of the substrate 30 during the laser cladding process is homogeneous and the hard particles are evenly distributed as a result of the hard particles being blended and evenly distributed throughout the agglomerate that is extruded around the center wire 26 of the flexcord 10. Therefore, the laser cladding process using the flexcord 10 results in a hardfaced surface on the substrate 30 with uniformly distributed characteristics of abrasion, wear, and erosion resistance achieved in an efficient, cost-effective, and reliable manner.

Each coated diamond particle 20 includes the protective coating 21, which has been metallurgically bonded to the exterior of each of the diamond particles 20 to form the diamond pellets. The exterior surface of each diamond particle 20 will generally be completely covered by the protective coating 21. But in some operating environments, wherein the metal matrix 22 and the organic binder 24 provide sufficient protection for the diamond particles 20, the laser cladding operation may be performed satisfactorily with less than one hundred percent (100%) coating on each diamond particle 20. Diamond particles 20 may be either synthetic diamond or natural diamond. Depending upon the intended application for the laser clad substrate, each diamond particle 20 may be selected within the same mesh range. For other applications, coated diamond pellets may be formed from diamond particles 20 selected from two or more different mesh ranges. As discussed above, the diamond particles in each pellet may be agglomerates of very small diamond particles that are 20 μm or less in size, or larger, individual diamond particles that are approximately 250 μm in size or larger. The resulting coated diamond pellets may have approximately the same exterior dimensions, or may vary in size in order to modify the wear, erosion and abrasion resistance of the resulting metallic matrix deposit to accommodate the specific operating environment associated with the substrate 30.

The metal matrix 22 includes metal, such as Ni, Cu, and Ti, and hard particles, such as tungsten carbide (WC), TiC, Ti $B_2$, $Cr_6C$, and $B_4C$. The metal may be in a powder form, and the organic binder 24 may be blended with the metal powder and the hard particles to a paste-like consistency that can be extruded around and along the center metal wire 26 and then allowed to dry and harden to form the flexcord 10. In various exemplary embodiments of the flexcord according to this disclosure, the agglomerate of a metal matrix 22, organic binder 24, and diamond pellets 20, 21 may include up to approximately 40% by weight metal matrix 22 combined with the organic binder 24, and 60% by weight hard particles. The hard particles may include tungsten carbide (WC), TiC, Ti $B_2$, $Cr_6C$, $B_4C$, and the diamond pellets 20, 21, with up to approximately 30% by weight of the hard particles (18% by weight of the agglomerate) being the diamond pellets. Smaller percentages by weight of diamond pellets can be used if desired, and percentages by weight greater than approximately 18% of the agglomerate result in little additional gain in wear or erosion resistance of the laser cladded substrate. The hard metal materials and hard particles such as WC, TiC, Ti $B_2$, $Cr_6C$, and $B_4C$ form a metallic matrix deposit on the surface of the substrate 30 after being melted by a laser beam, with the metallic matrix deposit providing a wear resistant layer of material even without the addition of the coated diamond pellets. However, the addition of the coated diamond pellets 20, 21 to the agglomerate and the resulting metallic matrix deposit on the surface of the substrate 30 significantly enhances the wear resistance and abrasion resistance of the cladding layer as compared to prior hardfacing materials.

In various embodiments of this disclosure the metallic matrix deposit cladded onto the surface of the substrate 30 includes a mixture of the metal matrix 22, carbide particles, such as WC, and the coated diamond pellets 20, 21 embedded or encapsulated by the organic binder 24. Various materials including cobalt (Co), copper (Cu), nickel (Ni), Titanium (Ti), iron (Fe), and alloys of these elements may also be used to form the metal matrix portion 22. The term "metallic matrix deposit" is used herein to refer to a layer of hardfacing which has been applied to a metal substrate to protect the substrate from abrasion, erosion and/or wear. Various binders such as the cobalt, nickel, copper, iron and alloys thereof may be included in the metal matrix portion 22 and mixed with the organic binder portion 24 of the agglomerate, thereby also forming part of the metallic matrix deposit applied at the surface of the substrate during the laser cladding operation. Various metal alloys and cermets such as metal borides, metal carbides, metal oxides and metal nitrides may also be incorporated into the agglomerate, and therefore included as part of the metallic matrix deposit.

The laser beam 60 used in various exemplary processes according to the present disclosure must be powerful enough to melt the flexcord and the surface of the substrate. A continuous wave carbon dioxide laser of at least approximately 1500 watt power output is suitable. Other types of lasers may include solid state lasers such as Nd:Yag (neodymium-doped yttrium aluminum garnet laser), fiber lasers, and diode lasers. The laser beam 60 used in one exemplary implementation of this disclosure may have approximately 5000 watt power and a beam diameter of approximately 0.4 inch. One of ordinary skill in the art will recognize that the intensity of the laser beam 60 and the duration of its impact on the substrate 30 may be adjusted to obtain a thickness of the bead 40 that may be at least partially dependent on the feed rate of the flexcord 10.

A controller (not shown) may control some or all of the operational parameters associated with the laser cladding process, including the feed rate of the flexcord 10, the power of the laser 52, and the relative movement between the laser beam 60, the flexcord 10, and the surface of the substrate 30. The controller may embody a single processor or multiple processors that include a means for controlling the various operations during laser cladding. Numerous commercially available processors may perform the functions of the controller. The controller may include or be associated with a memory for storing data such as, for example, an operating condition, design limits, performance characteristics or specifications of the laser 52 and a feeding mechanism for supplying the flexcord into the laser beam 60, operational instructions, and corresponding quality parameters and other characteristics of the surface of the substrate 30. Various other known circuits may be associated with the controller, including power supply circuitry, signal-conditioning circuitry, solenoid driver circuitry, communication circuitry, and other appropriate circuitry. Moreover, the controller may be capable of communicating with other components (e.g., with motors, actuators, sensors, and switches of laser 52 and/or the flexcord feeder) via either wired or wireless transmission.

As shown in FIG. 2, the abrasion and wear-resistant cladding material of flexcord 10 is deposited on the surface of the substrate 30 as the flexcord 10 is melted by the laser beam 60 to form the bead 40 of molten metallic matrix deposit. The bead 40 may be generally crowned, having a greater center depth and shallower lateral depths at opposing sides of the bead. The bead 40 may have a generally rounded smooth outer contour, with the center thereof rising above the wear surface of the substrate 30. During deposition, the abrasion and wear-resistant cladding material may penetrate into the partially melted surface of the substrate 30, and create a boundary mixture of the cladding materials within this region. The uniform composition of the flexcord 10 and ability to adjust the feed rate and readily manipulate the point of application of the flexcord to accommodate a variety of complex surface configurations provides for a controllable, consistent deposition and distribution of the hard diamond particles that are interspersed throughout the agglomerate encasing the center wire 26 of the flexcord 10 over the laser cladded surface of the substrate 30.

INDUSTRIAL APPLICABILITY

The disclosed laser cladding process using the flexcord 10 with metal matrix 22, organic binder 24, and coated diamond pellets 20, 21 may be used to enhance the wear characteristics of a variety of different components. The disclosed flexcord 10 enables a continuous laser cladding operation along various surfaces of substrates having complex configurations, and ensures a homogeneous cladding layer with an even distribution of hard particles including the diamond pellets throughout the cladding layer.

A method of hardfacing a component by laser cladding a surface of the component according to an exemplary implementation of this disclosure may include generating a laser beam and directing the laser beam to an area of a wear surface of the component. The method may also include feeding the flexcord 10 of a cladding material into the laser beam 60 produced by the laser 52 to melt the flexcord 10 and produce a bead 40 of the cladding material on the wear surface of the substrate 30.

The flexible cord 10 includes an inner metal wire 26 surrounded by an agglomerate of abrasion and wear-resistant material that contains diamond particles 20. Laser cladding processes according to various implementations of this disclosure include moving the laser beam 60 and the flexible cord 10 along the wear surface of the substrate 30 to produce a cladding layer over the wear surface of the component. The agglomerate surrounding the inner metal wire 26 is formed as a paste that is extruded onto the inner metal wire 26 and allowed to dry and harden to form the flexible cord 10. The agglomerate contains the metal matrix 22, the organic binder 24, and the diamond particles 20. The diamond particles contained within the agglomerate are coated and encapsulated with the protective coating 21. The protective coating 21 on the diamond particles 20 may include one of Ni or Cu that has been bonded to the diamond particles 20 through one of electrolysis, electroless plating, or electroplating. The agglomerate may contain approximately 40%±10% by weight metal combined with the organic binder 24 and 60%±10% by weight hard particles that include the diamond particles 20 encapsulated in a protective coating 21. The diamond particles 20 are approximately 1-30% by weight of the hard particles contained within the agglomerate, with the remainder of the hard particles including tungsten carbide particles, TiC. The diamond particles 20 are at least one of synthetic diamonds and natural diamonds, and may be approximately 250 μm±10% in diameter.

It will be apparent to those skilled in the art that various modifications and variations can be made to the disclosed flexible cord of laser cladding material and method of hardfacing through laser cladding without departing from the scope of the disclosure. Other embodiments of the flexible cord and implementations of the method of hardfacing will be apparent to those skilled in the art from consideration of the specification and practice of the apparatus and methods disclosed herein. It is intended that the specification and examples be considered as exemplary only, with a true scope of the disclosure being indicated by the following claims and their equivalents.

What is claimed is:

1. A method of hardfacing a component, comprising:
   generating a laser beam and directing the laser beam to an area of a wear surface of the component;
   feeding a flexible cord of a cladding material into the laser beam to melt the flexible cord and produce a bead of the cladding material on the wear surface, wherein the flexible cord includes an inner metal wire surrounded by an agglomerate of abrasion and wear-resistant material that contains diamond particles; and
   moving the laser beam and the flexible cord along the wear surface to produce a cladding layer over the wear surface of the component.

2. The method of claim 1, wherein the agglomerate surrounding the inner metal wire is formed as a paste that is extruded onto the inner metal wire and allowed to dry and harden to form the flexible cord.

3. The method of claim 2, wherein the agglomerate contains a metal matrix, an organic binder, and the diamond particles.

4. The method of claim 3, wherein the diamond particles contained within the agglomerate are coated with a protective coating.

5. The method of claim 4, wherein the protective coating on the diamond particles includes one of Ni or Cu that has been bonded to the diamond particles through one of electrolysis, electroless plating, or electroplating.

6. The method of claim 5, wherein the agglomerate contains 40%±10% by weight metal combined with the organic binder and 60%±10% by weight hard particles that include the diamond particles.

7. The method of claim 6, wherein the diamond particles are 1-30% by weight of the hard particles, with the remainder of the hard particles including tungsten carbide particles.

8. The method of claim 7, wherein the diamond particles are at least one of synthetic diamonds and natural diamonds.

9. The method of claim 8, wherein the diamond particles are 250 μm±10% in diameter.

10. A laser cladding process, comprising:
generating a laser beam and directing the laser beam to an area of a wear surface of a component; and
feeding a flexible cord of a cladding material into the laser beam to melt the flexible cord and produce a bead of the cladding material on the wear surface, wherein the flexible cord includes an inner metal wire surrounded by an agglomerate of abrasion and wear-resistant material, the agglomerate containing a metal matrix, an organic binder, and diamond particles, and being formed as a paste extruded onto the inner metal wire and allowed to dry and harden to form the flexible cord.

11. The laser cladding process of claim 10, wherein the diamond particles contained within the agglomerate are coated with a protective coating; wherein the protective coating on the diamond particles includes one of Ni or Cu that has been bonded to the diamond particles through one of electrolysis, electroless plating, or electroplating; and wherein the agglomerate contains 40%±10% by weight metal combined with the organic binder and 60%±10% by weight hard particles that include up to 30% by weight of the hard particles being the diamond particles with the remaining hard particles including tungsten carbide.

* * * * *